Sept. 3, 1935.  R. LANCELOT  2,013,000
REMOVABLE ATTACHMENT FOR DISPLAY SIGNS ON A SPARE TIRE
Filed May 18, 1934
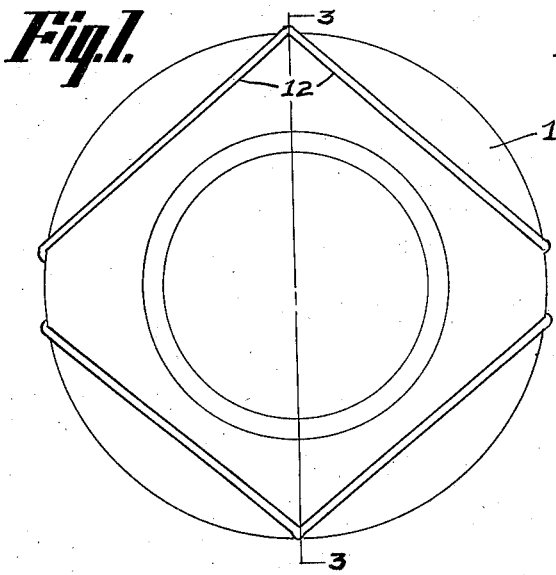
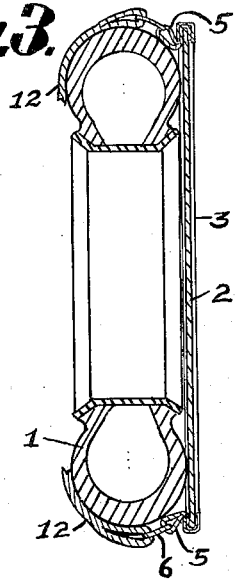
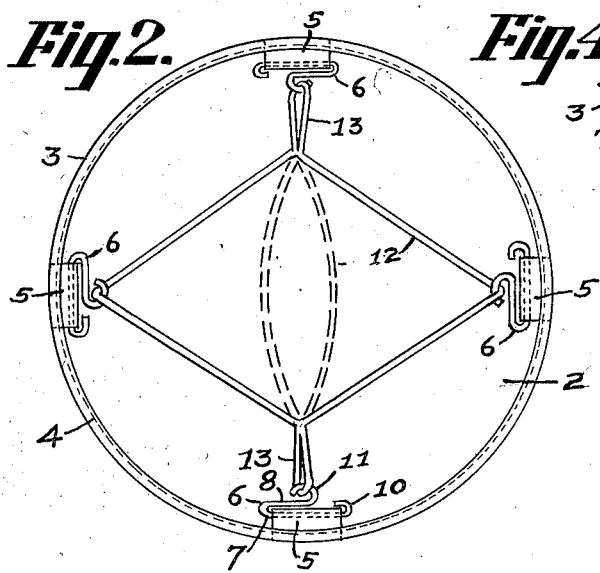
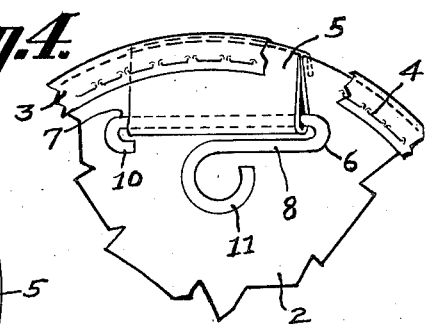
INVENTOR.
Ralph Lancelot
BY
ATTORNEY Patented Sept. 3, 1935

2,013,000

UNITED STATES PATENT OFFICE 2,013,000

REMOVABLE ATTACHMENT FOR DISPLAY SIGNS ON A SPARE TIRE

Ralph Lancelot, Pittsburgh, Pa.

Application May 18, 1934, Serial No. 726,251

2 Claims. (Cl. 40—129)

My invention relates to an attachment for a display sign, and while primarily intended for securing the latter in position on the spare automobile tire, it will be obvious that the device may be employed for any other purposes wherein it is found to be applicable.

Important objects of the invention are to provide an attachment of the character described, which is removable from the display member, which may be readily attached to the display member or conveniently detached from the latter, and which embodies novel connecting clips for joining the elastic tension cord with the display member.

Further objects of the invention are to provide a device of the class stated, which is simple in its construction and arrangement, durable and efficient in its use, and comparatively economical in its manufacture and use.

With the foregoing and other objects in view, which will appear as the description proceeds, the invention resides in the novel construction, combination and arrangement of parts herein specifically described and illustrated in the accompanying drawing, but it is to be understood that the latter is merely illustrative of an embodiment of the invention, and that the actual needs of manufacture and practice may necessitate certain mechanical variations. It is, therefore, not intended to limit the scope of the invention to the disclosure thereof illustrated, but rather to define such limitations in the appended claims.

In the drawing wherein like numerals of reference designate corresponding parts throughout the several views:

Figure 1 is a rear elevational view of a spare automobile tire provided with a display member attachment constructed in accordance with the present invention.

Figure 2 is a similar view illustrating the connection of the attaching elements with the display member.

Figure 3 is sectional view on line 3—3, Figure 1.

Figure 4 is an enlarged fragmentary view of the display member, and showing the manner of joining the connecting clip with the latter.

Referring in detail to the drawing 1 represents a spare pneumatic automobile tire as mounted upon a wheel rim in the usual manner, and carried at the sides or rear of the motor vehicle.

A flat display member 2, constructed from any suitable sheet material, is positioned flatly against the outer or exposed side of the tire 1. The display member is preferably, though not essentially, circular in contour, and has its peripheral edge margin reenforced by a binding 3, which overlaps said edge margin and is secured to the latter by stitching 4.

A plurality of looped tabs 5 are disposed on the back side of the display member 2. The free ends of each of the looped tabs are positioned under the binding 3 and secured with the latter to the edge margin of the display member by the stitching 4. The looped tabs are short but comparatively wide, and constructed from any suitable, strong, thin material. The looped tabs are preferably equally spaced relatively to each other, and may be of any suitable number to best meet conditions found in practice.

A substantially U-shaped connecting clip 6, preferably constructed from resilient wire, is detachably connected to each of the looped tabs 5, and embodies a long leg 7 and a short leg 8. The free end of the long leg is bent to form a small hook 10, which is disposed toward the short leg. The free end of the short leg is formed to provide a relatively large open eye 11. The latter extends in the direction remote from the long leg, and is disposed approximately centrally of the latter, as clearly illustrated in Figure 4.

To connect the clip 6 to the looped tab 5, the long leg 7, of the former, is simply inserted through the looped tab until the hook 10 clears and engages the latter.

It will here be noted that, the length of the long leg 7, of the clip 6, is approximately commensurate to the width of the looped tab 5, consequently it is necessary to gather the looped tab, while inserting the long leg, for the purpose of allowing the hook to clear the looped tab. In like manner, when removing the clip 6 from the looped tab 5, it is necessary to gather the latter to effect the release of the hook 10. The gathering of the looped tab is readily accomplished, as it is constructed from thin flexible textile fabric, and its return to the normal position, after the insertion of the long leg of the clip in the manner stated, will positively prevent the accidental disengagement of the clip from the looped tab.

A continuous, elastic tension cord 12 is employed for tensionally securing the display member 2 against the exposed side of the tire 1. The elastic cord engages in each of the clip eyes 11, as shown in Figure 2. The tension of the elastic cord is more effective and centralized by providing the latter with looped portions 13, thus providing additional strength when same passes over the tire tread and also for engaging alternate or all of the clip eyes. Further, the inherent resiliency of the connecting clips 6 themselves will augment the tensioning capacity of the attaching elements.

By disposing the eyes 11, of the connecting clips 6 centrally of the long leg 7 as disclosed, the tensional pull on each of the looped tabs 5 will be uniformly distributed throughout the width of the latter. The connection of the elastic tension cord 12 with the clips 6 will exert an equalized tensioned pull on all of the looped tabs 5, whereby the display member 2 will be held smoothly and immovably in position against the tire 1.

The attaching elements are disposed on that side of the tire 1 opposed to the side against which the display member 2 is positioned. The elastic cord 12 overlaps the tire tread and readily adjusts itself to secure a display member having a diameter more, equal to or less than the diameter of the associated tire.

The particular advantage, in employing the removable attaching elements embodied in the present invention, is that the display member, devoid of the attaching elements, may be printed perfectly with close register, which heretofore has been impossible due to the commonly used permanent attaching devices, including thick elastic tensioning cords and large connecting flaps that do not permit the display member to lie flat for efficient printing purposes.

The use of my improved removable attaching elements allow the display members to be more compactly stacked for facilitating transportation and storage, and further permits the removal of the attaching elements from a discarded display member and its subsequent connection with another usable display member, whereby a substantial saving is obviously effected.

What I claim is:

1. In combination, a display member adapted to be positioned against one side of an automobile tire, looped elements secured to the periphery of said display member, a connecting clip detachably joined with each of said looped elements, and an elastic member removably joined with each of said connecting clips for tensionally holding said display member in position.

2. In combination, a display member adapted to be positioned against one side of an automobile tire, looped elements secured to the peripheral edge of said display member, a connecting clip detachably joined in each of said looped elements, and an elastic member having looped portions joined with said connecting clips for tensionally holding said display member in position, substantially as described and for the purpose set forth.

RALPH LANCELOT.